Oct. 21, 1924.  
S. SOLOP  
1,512,498

COMBINED DRILL AND SCREW SET

Filed Oct. 19, 1922

INVENTOR.  
Sydor Solop  
BY George C. Heinricks  
ATTORNEY.

Patented Oct. 21, 1924.

1,512,498

UNITED STATES PATENT OFFICE.

SYDOR SOLOP, OF SOUTH BROOKLYN, NEW YORK.

COMBINED DRILL AND SCREW SET.

Application filed October 19, 1922. Serial No. 595,596.

*To all whom it may concern:*

Be it known that I, SYDOR SOLOP, a citizen of Poland, residing at So. Brooklyn, county of Kings, and State of New York, have invented certain new and useful Improvements in Combined Drills and Screw Sets, of which the following is a specification.

This invention relates to improvements in the combined drill and screw set disclosed in my Patent No. 1,424,600, dated August 1, 1922, and it is the principal object of my invention to overcome certain disadvantages inherent in the old construction as the practical use of my device has shown.

One of these disadvantages is the failure to obtain at all times positive action from the thumb actuated latch, the construction of which moreover has in practice been shown to be too complicated and apt to get easily out of order, and it is one of the main objects of the present invention to provide in its stead a positively working locking nut.

In the accompanying drawing, forming a material part of this disclosure:

Figures 1, 2:
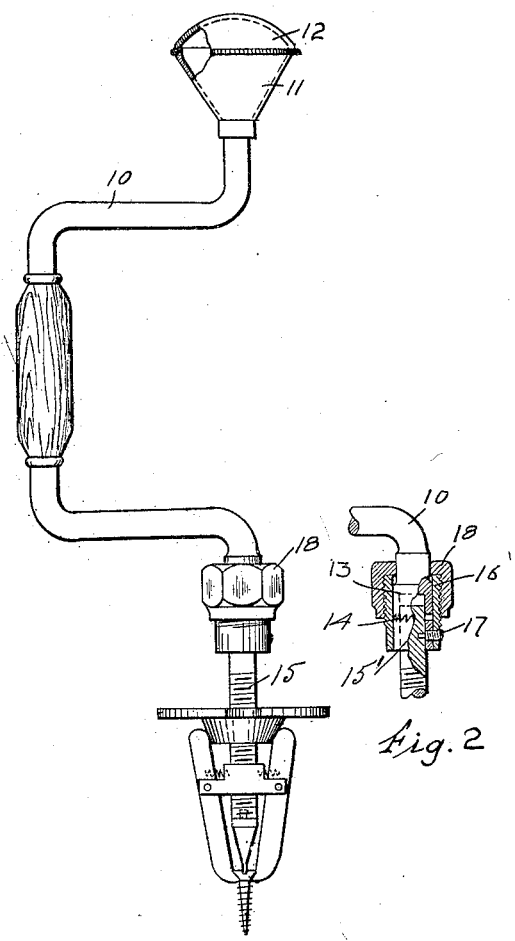
Figure 1 is an elevational view of the device, constructed according to the present invention, as assembled.
Figure 2 is a partial sectional view of the locking nut and co-operating parts.

As illustrated in Figures 1 and 2, the frame 10 of a bit-stock carries a hollow handle 11 for the reception of a plurality of auxiliary tools, and is provided with a removable cover 12. The lower end of the frame is formed into a socket 13 provided with ratchet teeth 14 adapted to engage similar teeth at the upper end of a sleeve 15' fitting a screw threaded spindle 15. A sleeve 16 provided with outer thread is secured to the sleeve 15' and spindle 15 by means of a threaded screw pin 17, and the thread of the sleeve 16 is engaged by a nut 18 provided for this purpose with an interior thread. The nut 18 acts as a union to connect the lower end of the frame with the upper end of the spindle and permits independent rotation of the frame in one direction over the teeth of the screw threaded spindle. The ratchet teeth of the frame and spindle interlock for unitary movement when the frame is moved in the opposite direction.

The means for gripping the tools as illustrated is identical with that shown in the patent previously referred to, No. 1,424,600 and needs not be specifically described herein.

Having thus described my invention what I claim as new and desire to secure by Letters Patent of the United States is—

A combined drill and screw set comprising a frame and a tool holder, a ratchet connection between frame and holder, an exteriorly threaded sleeve secured to said holder and connecting frame and holder, an interiorly threaded nut for holding the parts in their connected position, the adjacent ends of the frame and tool holder being provided with ratchet teeth, the connecting nut permitting longitudinal play of the parts to insure disconnection of the ratchet teeth in the relative movement of either part in one direction.

In testimony whereof I have affixed my signature.

SYDOR SOLOP.